United States Patent Office 3,409,700
Patented Nov. 5, 1968

3,409,700
METHOD FOR DEHYDROGENATING AND CRACKING ALKANES AND OLEFINS
Charles R. Noddings, Midland, and Ronald G. Gates, Breckenridge, Mich., assignors to Dow Chemical Company, Midland, Mich., a corporation of Delaware
No Drawing. Continuation-in-part of applications Ser. No. 335,901 and Ser. No. 335,930, Jan. 6, 1964. This application Dec. 27, 1966, Ser. No. 604,623
6 Claims. (Cl. 260—683)

ABSTRACT OF THE DISCLOSURE

This invention concerns catalytic materials which are coprecipitated zinc-nickel or nickel-zinc phosphate catalysts having respectively 6 to 12 atoms of zinc per atom of nickel and 6 to 12 atoms of nickel per atom of zinc, and a process employing these catalysts for the dehydrogenation and cracking of aliphatic hydrocarbons, primarily paraffins and olefins having three or more and preferably four carbon atoms in the carbon chain to form the corresponding unsaturated hydrocarbons, e.g., olefins and conjugated dienes, as well as the lower carbon chain compounds, such as the two and three carbon chain compounds.

CROSS-REFERENCE TO RELATED APPLICATIONS

The present application is a continuation-in-part of our copending applications Ser. Nos. 335,901 and 335,930, entitled "Zinc Nickel Phosphate Catalyst and Method for Dehydrogenating and Cracking Alkanes and Olefins" and "Nickel Zinc Phosphate Catalyst and Method for Dehydrogenating and Cracking Alkanes and Olefins," respectively, each filed Jan. 6, 1964, both of which are now abandoned.

BACKGROUND OF INVENTION

It is, of course, well known that aliphatic hydrocarbons, e.g., petroleum fractions (mixed hydrocarbons) or individual paraffins or olefins, can be pyrolyzed to obtain a mixture of products comprising a small, though appreciable, proportion of conjugated diolefins and a larger proportion of shorter chain unsaturated products. During such pyrolysis, it is thus evident that several different kinds of reactions usually occur simultaneously, e.g., dehydrogenation, cracking of the carbon-to-carbon linkages in the molecule and polymerization of unsaturated hydrocarbons, so that the product is, in most instances, a hydrocarbon mixture. An example of such product is cracked-oil gas, containing paraffinic hydrocarbons ranging in chain length from methane to hexane, olefins ranging from ethylene to hexylene, and a small amount, usually less than 10%, of less saturated hydrocarbons such as butadiene, isoprene, piperylene and acetylenic hydrocarbons. The difficulties involved in recovering the more useful products from such mixture add greatly to their cost.

It is an object of this invention to provide an improved method for the dehydrogenation and/or cracking of $C_3$ and higher hydrocarbons, and particularly of cracking $C_4$ and higher hydrocarbons to useful lower molecular weight hydrocarbons. Another object of the present invention is to provide such a method whereby useful organic products (that is products other than $CO_2$, carbon and hydrogen) from the pyrolysis (i.e., cracking and/or dehydrogenation) are obtained in quantities which increase the economic value of the products over that of the starting carbon compounds. A further object is to provide a set of operating conditions under which the new catalysts may effectively be used for the foregoing purposes. Other objects will be apparent from the following description of the invention.

SUMMARY OF INVENTION

We have found that a phosphate containing an average of between 6 and 12 and preferably from about 6 to about 9 atoms of either zinc per atom of nickel or nickel per atom of zinc coprecipitated then settled from the reaction mixture is, under certain operating conditions, effective in catalyzing the thermal dehydrogenation and/or cracking of $C_3$ hydrocarbons, particularly the cracking of $C_4$ and higher hydrocarbons, to $C_2$ and $C_3$ hydrocarbons, containing a high proportion of olefins.

The catalyst is prepared by mixing together water-soluble metal salts of zinc and nickel with a water-soluble form of the orthophosphate moiety ($PO_4^\equiv$) in an aqueous medium under conditions such that the pH is within the range of from 4 to 10. Material of good catalytic quality is obtained when the zinc and nickel are employed to provide from 6 to 12 moles of either nickel or zinc per mole of zinc or nickel, respectively. Further, while not critical, but desirable, the phosphate moiety is employed in a slight excess over that which is theoretically necessary to combine with the metal ions to form a metal orthophosphate. It is to be understood that the pH may but does not have to be maintained within the operative range during mixing but can be adjusted, after mixing, by addition of a base or acid as necessary to the reaction mixture to bring the solution within the desired range thereby producing a catalytically active material.

The contacting and mixing of the reactants in accordance with the above recitation can be carried out in several manners, such as simultaneously, stepwise or intermittently each in either batchwise or continuous manner.

Examples of salts which may be used as starting materials in preparing the catalyst are the chlorides, bromides, nitrates, and acetates, etc., of zinc and nickel. Examples of soluble phosphates that may be employed as starting materials are disodium phosphate, trisodium phosphate, dipotassium phosphate, diammonium phosphate, as well as phosphoric acid, etc.

The catalyst can also be prepared in either a batchwise manner or a continuous manner by feeding separate streams of a base, preferably aqueous ammonia, although other basic mediums can be employed as well as mixtures of two different bases and, as either a single or as separate streams, an aqueous solution of zinc and nickel salts (in relative proportions corresponding to between 6 and 12 and preferably about 6 to 9 atoms of either nickel or zinc per atom of zinc or nickel, respectively), and, either separately or as a part of any one of the aforesaid streams, a dissolved orthophosphate, into a reaction chamber. The relative rates of flow are adjusted so that the resultant mixture will achieve continuously or upon completion of the mixing a pH between 4 and 10. It is desirable in a continuous or stepwise operation to retain within the reaction zone a portion of the zinc-nickel phosphate which forms and precipitates. This is conveniently achieved by adjusting the outflow of the product slurry to retain a portion of the flocculent material which settles rapidly and of the aqueous slurry that contains 2% by weight or more, usually from 7.5 to 10%, of the zinc-nickel or nickel-zinc phosphate. The reaction mixture, or preferably the settled lower layer thereof, may be filtered to obtain a filter cake which contains 10% or more, usually about 22% of the zinc-nickel phosphate or nickel-zinc phosphate.

In order to obtain a rapid settling zinc-nickel phosphate of good catalytic activity, it is important that the two or more streams of the above-mentioned starting materials flow into admixture with one another, e.g., within a body of the resulting mixture, at relative rates such as to maintain the resultant mixture at a pH value between 4 and 10 or the resulting mixture is brought to the desired pH range before settling. Thus, the present process includes the precipitation of the materials at a pH outside the range of pH 4–10 and adjustment before settling to within the aforesaid range. The phosphate precipitated from a mixture of higher pH value (>10) which is then adjusted to about 4 ot 10 is of good catalytic activity, but is extremely slow in settling. The phosphate precipitated from a mixture of pH value below 4 settles rapidly, but is less active as a catalyst for the cracking and dehydrogenation of $C_4$ hydrocarbons than is phosphate precipitated from mixtures within the range of 4 to 10 pH. It is advantageous, to obtain product of rapid settling rate, that a portion of the precipitated phosphate be retained in the mixing and reaction zone, that is the catalyst is being formed and precipitated in the presence of a slurry of the zinc-nickel phosphate or nickel-zinc phosphate.

It is desirable that the points of feed, to the aqueous mixture in the mixing chamber of the streams of the two starting materials be remote from one another and that the mixture be stirred, or otherwise agitated, during introduction of the starting materials. Either starting material may, of course, be introduced through a plurality of inlets.

Usually water is employed as the solvent for the starting materials, but other ionizing solvents, e.g., aqueous alcohol, may in some instances be used.

In any event after the reaction is complete the precipitate is separated from the liquor by filtration or decantation and is washed with water, decanting or filtering after each washing. The washing should be carried out so as to remove as thoroughly as possible readily soluble compounds from the product, since such impurities have a disturbing and erratic action on the thermal decomposition of hydrocarbons. Of particular attention are the unreacted chlorides or byproduct chlorides which, if retained in the catalyst, tend to deactivate the latter. The catalyst is, at this stage in its preparation, a solid or gel-like substance which is apparently amorphous.

After being washed with water, the product is dried, usually at temperatures between 60° and 150° C. The dried product is a hard gel usually of yellowish color. The gel may be crushed or otherwise reduced to granules, or small lumps, and be used directly as a dehydrogenation catalyst. However, it is preferably pulverized, e.g., to a particle size capable of passing a 28-mesh screen, and the powdered product is treated with a lubricant and is pressed into the form of pills, tablets, or granules of size suitable for use as a catalyst, e.g., into the form of tablets of from $\frac{1}{16}$ to $\frac{1}{2}$ inch diameter. The lubricant serves to lubricate the particles during the operation of pressing them into pills and its use permits the formation of pills of greater strength and durability than are otherwise obtained. As the lubricant we preferably use a substance capable of being removed by vaporization or oxidation from the product, e.g., a substance such as graphite, a vegetable oil, or a hydrocarbon oil, etc.

The catalyst so produced is capable of cracking and dehydrogenating hydrocarbons in the presence of steam at temperatures between 600° and 750° C., and in some instances at temperatures as much as 50° C. below or above this range. The reaction is advantageously carried out at temperatures between 650° and 700° C.

Except for the foregoing limitations, the conditions under which the reactions are carried out may be varied widely. Also, the method is operable at atmospheric, subatmospheric, or at superatmospheric pressures, provided the hydrocarbon reactant is in vaporized form. In some instances, the yield of dehydrogenated product decreases upon increase of the reaction pressure above atmospheric. However, the ability to operate at an increased pressure is of considerable advantage, since condensation of the reaction products may thereby be facilitated. In general, the proportion of hydrocarbon reacted and also the amount of byproduct formation per pass through the catalyst bed tend to decrease with increase in the rate of vapor flow, and vice versa.

In producing cracked and dehydrogenated hydrocarbon products in accordance with the invention, a reaction chamber is charged with the granular catalyst and the lubricant employed is removed from the catalyst. This is usually accomplished by passing an $O_2$-containing gas such as oxygen or air, preferably a mixture of about equal volumes of air and steam, through the catalyst bed at a high temperature, e.g., 450° to 750° C. When the lubricant used in preparing the catalyst pellets or granules is a substance capable of being vaporized, e.g., a mineral or vegetable oil, the step of treating the catalyst with air may be preceded by one of passing an inert gas or vapor, such as steam, nitrogen, or carbon dioxide, over the catalyst so as to vaporize at least a portion of the binding agent from the catalyst pellets or granules.

After freeing the catalyst of the lubricant, the catalyst bed is swept free of the $O_2$ or air with steam and is heated to the desired reaction temperature, preferably by passing superheated steam through the same. A mixture of steam and the hydrocarbon reactant, e.g., propane, butylene, amylene, hexylene, butane, pentane, or hexane, having at least three carbon atoms, is then passed through the catalyst bed at a temperature between 600° and 750° C., and preferably between 650° and 700° C. The usual procedure is to pass the hydrocarbon gas into admixture with steam which has been superheated to 750° C. or above, i.e., to a temperature sufficient so that the resultant mixture is at the desired reaction temperature, and to pass the mixture through the bed of catalyst. However, the heat may be supplied in other ways, e.g., by forming the steam and hydrocarbon mixture at a lower temperature and passing the mixture through a preheater to bring it to the desired temperature, or by externally heating the catalyst chamber itself. The yield of olefins is usually highest when from 10 to 20 volumes of steam are employed per volume of the gaseous or vaporized hydrocarbon, but the steam may be used in smaller or larger proportions if desired. As hereinbefore mentioned, the rate of vapor flow through the catalyst chamber may be varied widely, but in practice the flow usually corresponds to between 100 and 700 liters of the hydrocarbon (expressed as at 0° C. and 760 millimeters' pressure) per liter of catalyst bed per hour.

The vapors issuing from the catalyst chamber are ordinarily passed through heat exchangers to condense the water and the hydrocarbon products. By repeatedly recycling the unreacted hydrocarbons, an olefin product may be produced in a 60% yield or higher and usually in a yield of from 70 to 75% of theoretical or higher.

During use in the process, the catalyst gradually accumulates a small amount of carbon, or non-volatile organic material, and loses its activity. Accordingly, flow of the hydrocarbon starting material is periodically interrupted and air, admixed with the steam, is blown through the catalyst bed, e.g., at temperatures between 450° and 700° C., and preferably at the dehydrogenating temperature, to oxidize and remove the carbonaceous or organic material and thus reactivate the catalyst. Usually from 10 to 30 minutes is required to carry out this reactivation step. However, if, during compounding of the catalyst into tablet form, an agent having the property of catalyzing the oxidation of carbon is admixed therewith, the time subsequently required for reactivating the catalyst with steam and air may be reduced markedly. For instance, the incorporation of one or two percent by weight of chromic oxide in the catalyst tablets facilitates reactivation of the catalyst. Other agents having the property of catalyzing the burning of carbon are known to the art.

After completing the reactivation step, the catalyst chamber is again swept free of air with steam, and the introduction of hydrocarbons, together with the steam, is resumed. Usually, reactivation of a catalyst is advisable after from 15 to 60 minutes of use in the dehydrogenation reaction. In practice, two or more catalyst chambers are preferably employed in a system provided with connections for passing the reaction mixture alternately through different catalysts beds. One catalyst bed is usually employed in the dehydrogenation reaction while another is being reactivated. By operating in this manner, the dehydrogenation reaction may be carried out continuously.

The following examples illustrate the present invention, but are not to be construed as limiting.

Example 1

Nickel chloride, 3.6 gram-moles, as a 22 weight percent aqueous solution thereof, was mixed in a vessel with 21.6 gram-moles of zinc chloride as an 11.5 weight percent aqueous solution and 17.3 gram-moles of phosphoric acid as a 75.1 weight percent aqueous solution and the resulting mixture is diluted with water to a total volume of 110 gallons. A total of 52 gram-moles of a 11.6 weight percent of ammonium hydroxide was added during the 2.6 hours of reaction with stirring. The reaction was considered complete when the final pH remained constant. The final pH was 5.0. Thereafter the reaction mass was allowed to settle overnight after which the supernatant liquid was drawn off (approximately 92 gallons decanted) and the resulting thick slurry filtered and washed with water. The filtrate was discarded. In the specific instance the slurry was washed by decantation with water 9 times until chloride-free, then removed and dried at 100° C. in a rotary drier. The dry powder was recovered to the extent of 89% of the theoretical yield, based on the starting materials used, and was crushed, mixed with 2% by weight of a lubricant grade graphite and 10% Sterotex and expressed into pellets about ¼ inch in diameter and ¼ inch long. The graphite was burned off by treating the pellets with air and steam at about 650° C. for about 6 hours. The resulting catalyst (containing a ratio of 6 atoms of zinc per atom of nickel) in a granular form (the pellets broke during the removal of the pelleting agent) was tested as cracking catalyst at 700° C., 150 v./v./hr. (volumes of gas per unit volume of catalyst per hour) (S.T.P.) of 99% n-butane, 3000 v./v./hr. of steam and 1.0 hr. cycle, half of which was regeneration. There was obtained a yield of 81.5% of $C_2H_4$ (35%) and $C_3H_6$ (46.5%), plus a 4.5% yield of n-$C_4H_8$, all yields based on the carbon content of the butane converted. The conversion per pass was 22%. Regeneration of the catalyst was carried out for approximately 30 minutes of each cycle by passing 85 v./v./hr. of air and 3000 v./v./hr. of steam at 700° C. through the catalyst bed at atmospheric pressure.

Example 2

In a like manner as that employed in Example 1 but using the following amounts of starting materials, a catalyst was prepared having a zinc to nickel ratio of 9 to 1 respectively:

| | Moles |
|---|---|
| $ZnCl_2$ | 10.83 |
| $NiCl_2$ | 1.20 |
| $H_3PO_4$ | 8.24 |
| $NH_4OH$ | 24.72 |

These materials were added and mixed in the same manner as Example 1, employing 110 gallons of water as there set forth. The final pH, at the end of the 2.8 hours required to precipitate the catalytic material, was 4.5. The catalyst was dried, mixed with 2% of a lubricant grade graphite and 10% Sterotex, pelleted, the pelletizing aid burned off and the so-formed catalyst, which broke into a granular form, was employed in the process above described. The results were a 10% conversion per pass of the butane to $C_2H_4$ and $C_3H_6$ in an 88.3% yield.

Example 3

Nickel chloride, 10.5 gram-moles, as a 30.3 weight percent aqueous solution thereof, was mixed in a vessel with 1.75 gram-moles of zinc chloride as a 5.1 weight percent aqueous solution and 8.42 gram-moles of phosphoric acid as a 75.6 weight percent aqueous solution and the resulting mixture was diluted with water to a total volume of 53 gallons. A total of 25.2 moles of an aqueous 12.0 weight percent ammonium hydroxide solution was added during the 2.5 hours reaction period. The pH at the end of this period was 5.5. The reaction was considered complete when the final pH remained constant, which in this instance was 5.5. Thereafter the reaction mass was allowed to settle overnight after which the supernatant liquid was drawn off (approx. 46 gallons decanted) and the resulting thick slurry filtered and washed with water. The filtrate was discarded. In the specific instance the slurry was washed by decantation with water 4 times until chloride-free, then removed and dried at 100° C. in a rotary drier. The dry powder was recovered to the extent of 90% of the theoretical yield, based on the starting materials used, and was crushed, mixed with 2% by weight of a lubricant grade graphite and expressed into pellets about ¼ inch in diameter and ¼ inch long. The graphite was burned off by treating the pellets with air and steam at about 650° C. for about 6 hours. The resulting catalyst pellets were tested as cracking catalyst at 700° C., 150 v./v./hr. (volumes of gas per unit volume of catalyst per hour) (S.T.P.) with 99% n-butane, 3000 v./v./hr. of steam and 1.0 hour cycles, half of which was regeneration. There was obtained a yield of 71% of $C_2H_4$ (32.5%) and $C_3H_6$ (38.5%), plus an 8% yield each of the individual compounds 1,3-butadiene and n-$C_4H_8$, all yields being based on the carbon content of the butane converted. The conversion per pass was 21%. The catalyst was regenerated for ½ of the period of each cycle by passing 85 v./v./hr. of air and 3000 v./v./hr. of steam at 700° C. and atmospheric pressure through the bed for about 30 minutes.

Example 4

In the manner of Example 3, two additional catalysts were prepared and tested in the same manner as Example 3. The specific details are set forth below:

| Mole Ratio Ni/Zn | Final pH of ppt. | Percent based on carbon content of butane converted | | | |
|---|---|---|---|---|---|
| | | $C^1$ of $C_4H_{10}$ | $Y^2$ to $C_2$ and $C_3$ | Y to $C_4H_8$ | Y to $C_4H_6$ |
| 9 | 5.6 | 20.1 | 67.4 | 3.0 | 5.0 |
| 6 | 8.6 | 18.7 | 67.7 | 3.9 | 3.1 |

[1] C, means conversion of butane per pass.
[2] Y, means yield named product of feed converted.

We claim:

1. The method which comprises dehydrogenating and cracking an aliphatic hydrocarbon having at least 3 carbon atoms by passing the hydrocarbon together with steam at a temperature between 600° and 750° C. in contact with a catalyst composed of a metal phosphate material consisting essentially of phosphate radicals chemically combined with zinc and nickel in the relative proportions of between 6 and 12 atoms of zinc per atom of nickel which metal phosphate material is preparable by mixing a solution of soluble salts of zinc and nickel with a soluble source of orthophosphate ion and precipitating said metal phosphate material in a gel form from the mixture at a pH of between about 4 to 10.

2. The method of claim 1 which comprises passing a mixture of (1) hydrocarbon vapors containing a paraffin having 4 carbon atoms and (2) between 10 and 20 volumes of steam per volume of hydrocarbon into contact with the catalyst.

3. The method of claim 2 wherein the paraffin is normal butane.

4. The method which comprises dehydrogenating and cracking an aliphatic hydrocarbon having at least 3 carbon atoms by passing the hydrocarbon together with steam at a temperature between 600° and 750° C. in contact with a catalyst composed of a metal phosphate material consisting essentially of phosphate radicals chemically combined with nickel and zinc in the relative proportions of between 6 and 12 atoms of nickel per atom of zinc which metal phosphate material is preparable by mixing a solution of soluble salts of nickel and zinc with a soluble source of orthophosphate ion and precipitating said metal phosphate material in a gel form from the mixture at a pH of between about 4 to 10.

5. The method of claim 4 which comprises passing a mixture of (1) hydrocarbon vapors containing a paraffin having 4 carbon atoms and (2) between 10 and 20 volumes of steam per volume of hydrocarbon into contact with the catalyst.

6. The method of claim 5 wherein the paraffin is normal butane.

References Cited

UNITED STATES PATENTS 2,456,367  12/1948  Britton et al. _____ 252—437
2,542,813  2/1951   Heath _____ 252—437

OTHER REFERENCES

Mellor: "A Comprehensive Treatise on Inorganic and Theoretical Chemistry," vol. 15, page 495, Longmans, Green and Co., New York, N.Y., 1936.

DELBERT E. GANTZ, *Primary Examiner.*

C. E. SPRESSER, Jr., *Assistant Examiner.*